United States Patent [19]
Plourde

[11] 3,877,641
[45] Apr. 15, 1975

[54] RAIL FISH JOINT AND METHOD OF MAKING THE SAME

[76] Inventor: Joseph Rolland Plourde, P.O. Box 217, Victoriaville, Quebec, Canada

[22] Filed: Oct. 1, 1973

[21] Appl. No.: 402,350

[52] U.S. Cl. ............................... 238/234; 238/243
[51] Int. Cl. ............................................ E01b 11/02
[58] Field of Search.... 238/151, 230, 231, 232–243, 238/252, 260, 262

[56] References Cited
UNITED STATES PATENTS

| | | | |
|---|---|---|---|
| 768,087 | 8/1904 | Sulkey | 238/234 |
| 772,650 | 10/1904 | Ellmore | 238/231 |
| 831,542 | 9/1906 | Deuberry | 238/234 |
| 1,076,917 | 10/1913 | Shaw | 238/234 |
| 2,051,224 | 8/1936 | Rape | 238/237 |
| 2,069,478 | 2/1937 | Petko | 238/237 |

Primary Examiner—Robert S. Ward, Jr.
Assistant Examiner—Richard A. Bertsch

[57] ABSTRACT

A joint for a pair of spaced-apart rail ends and a method of making the same joint which includes a pair of rail joint members positioned into the space between the rail ends and a fish-plate extending on each side of the latter, attached to both rail ends and to the rail joint members, securing one rail joint member to one abutting rail end for bodily movement therewith and secured to the other rail joint member and to the other rail end for sliding displacement relative thereto, whereby to allow longitudinal displacement of lapping portions of the rail joint members alongside each other. A method of making the joint advantageously allowing installation on the site of an installed railway with a minimum disturbance of the existing rail sections.

10 Claims, 13 Drawing Figures

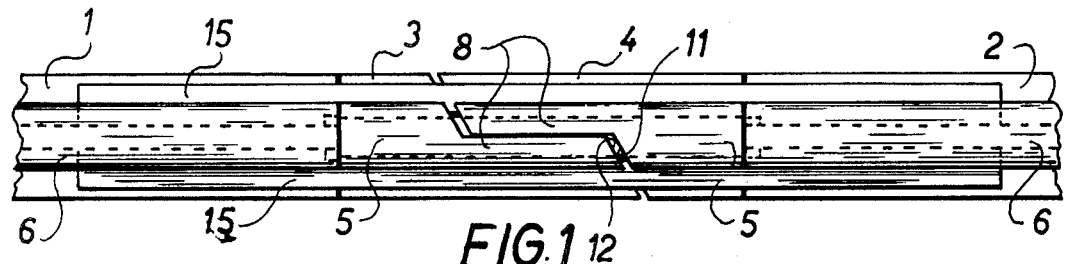
FIG.1
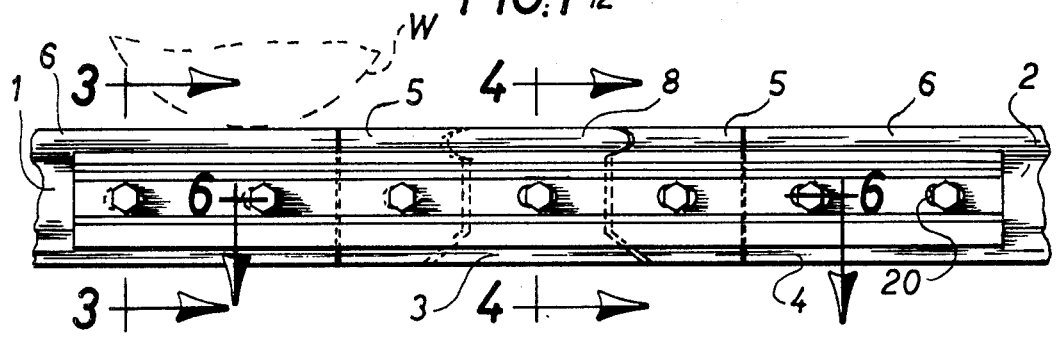
FIG.2
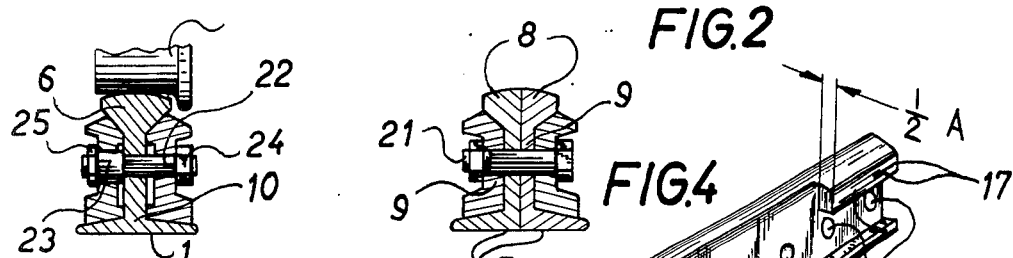
FIG.3
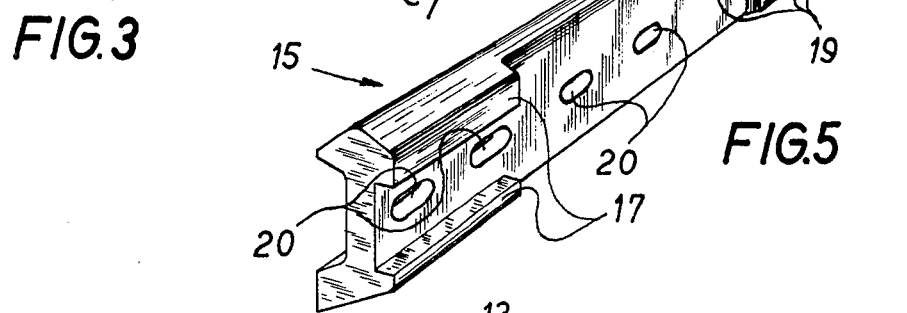
FIG.4
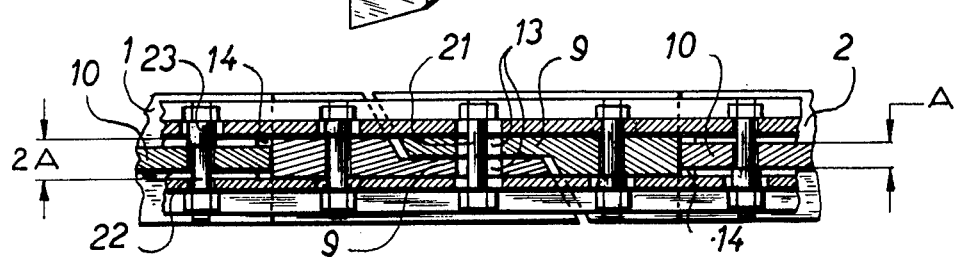
FIG.5
FIG.6

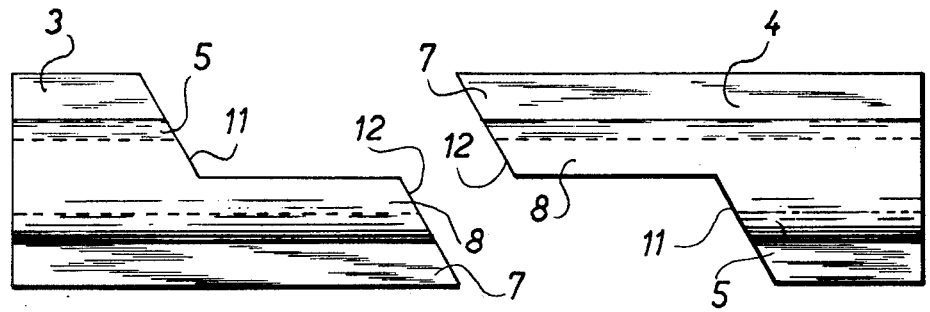
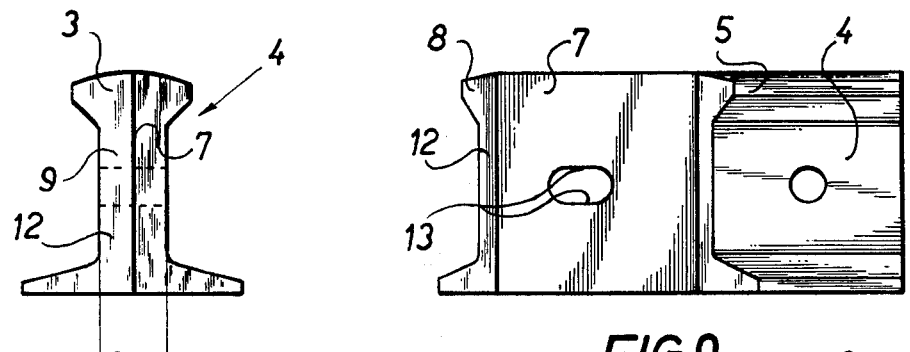
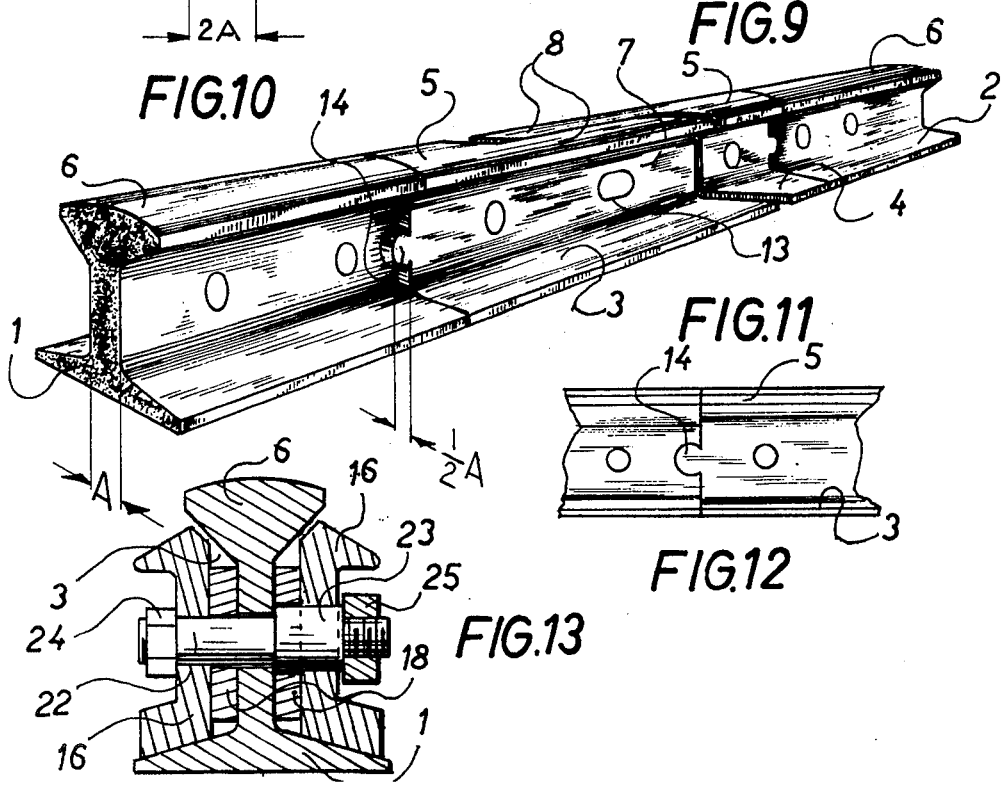

3,877,641

RAIL FISH JOINT AND METHOD OF MAKING THE SAME

This invention relates to rail joints and, more particularly, to a rail fish joint of the type adapted to form a substantially continuous head while allowing relative expansion and contraction between the rail ends at the joint.

The rail joints which have been proposed so far are made of lapping portions which constitute integral parts of the adjoining ends of two consecutive rail sections. Therefore, after a rail has been installed, a substantial amount of work has to be done to insert such joint at one place or another along the rail.

It is a general object of the invention to provide a rail joint of the above type which may be easily and readily added along an installed rail with minimum disturbance of the existing rail sections and relatively little work on the railway site.

It is another general object of the invention to provide a rail joint of the above type which includes a pair of rail joint members arranged to be inserted into a space between a pair of rail ends and a fishplate on each side of the rail joint members to secure the latter to the rail ends.

It is a further object of the invention to provide an improved method of forming a rail joint which includes cutting an installed rail to provide rail ends defining a space into which rail joint members according to the invention are secured by a pair of fishplates extending on opposite sides of the rail ends respectively and each secured to the latter.

It is a further object of the invention to provide a rail fish joint of the above type including a pair of fishplates which are slidably mounted lengthwise of each other on opposite sides of a pair of rail ends to which they are secured and which rail ends are spaced apart end to end relative to each other.

The invention will now be described in detail with reference to a preferred embodiment thereof which is illustrated, by way of example only, in the accompanying drawings, in which:

FIG. 1 is a top view of a rail joint according to the present invention;

FIG. 2 is a side elevation view of the rail joint of FIG. 1;

FIGS. 3 and 4 are cross-sectional views as seen along lines 3—3 and 4—4 respectively in FIG. 2;

FIG. 5 is a perspective view of one embodiment of fishplate according to the invention;

FIG. 6 is a cross-sectional view as seen along line 6—6 in FIG. 2;

FIGS. 7 and 8 are top views of a pair of complementary rail joint members respectively, according to the invention;

FIGS. 9 and 10 are side and front views respectively of one rail joint member, as shown in FIGS. 7 and 8;

FIG. 11 is a perspective view of a rail fish joint according to the invention;

FIG. 12 is a side view of a socket connection used to join a rail joint member to a rail end; and FIG. 13 is a cross-sectional view, as shown in FIG. 3, but showing different fishplates.

The illustrated rail joint according to the invention is adapted to be secured into a space between a pair of rail ends 1 and 2 which are aligned in spaced-apart end-to-end relationship. The above-mentioned spatial arrangement of the rail ends may be obtained either upon installing a railway or by cutting off a portion of a rail section to provide the necessary space.

A pair of rail joint members 3 and 4 are adapted to be secured into the afore-mentioned space between the rail ends 1 and 2. The rail joint members 3 and 4 may be of assorted lengths to fill spaces of different lengths or may be identical to simplify the production thereof. Each rail joint member 3, 4 has one end portion adapted to abut against one of the rail ends 1 and 2 and has a head 5 of normal width, for instance of the same width as the head 6 of the adjacent rail end. Each rail joint member 3, 4 includes a lapping portion 7 projecting away from one end of the corresponding end portion. The lapping portions 7 are arranged to extend lengthwise of the rail alongside each other and form each a head 8 of lesser width than a conventional head, such as the heads 5 and 6, as best shown in FIGS. 1 and 11. Each of the two lapping portions makes contact with the other along three surfaces which appear piecewise linear and continuous when seen in plan view. The second or middle one of these surfaces, being between 11 and 12, is parallel to the length of the rail while the other two, surfaces 11 and 12, are oblique to the rail joint members and parallel to each other and join in lateral transition the second surface to the outer edges of the rail joint members. The web 9 of each lapping portion 7 has substantially the same thickness as the web 10 of the rail ends 1 and 2 or a conventional rail. The web of each end portion therefore has substantially twice the thickness of a conventional web and of the web 9. The above-mentioned thickness of the latter web therefore provides each lapping portion 7 with sufficient strength to support alone the load of a wheel W. The end portion and the lapping portions are formed with oblique surfaces 11 and 12 respectively at least at the top along the heads 5 and 8. The oblique surfaces 11 and 12 form gradual transitions between the lapping portions and the end portions for smooth rolling of the wheel W from one to the other.

At least one bore or hole is drilled or formed transversely through each of the above-mentioned end portions and the rail ends 1 and 2. In the illustrated embodiment, each end portion is provided with one hole and each rail end 1 and 2 is provided with two holes, as best shown in FIG. 11. The lapping portions 7 are each provided with a transverse aperture 13 which laterally extends lengthwise of the rail ends, as best shown in FIGS. 9 and 11. Each rail joint member 3 and 4 is provided with a locking projection or bead 14 on the free end thereof engaging into a matching socket or recess formed into the rail end, as best shown in FIGS. 11 and 12.

The rail joint members 3 and 4 are secured relative to each other and to the rail ends 1 and 2 by a pair of fishplates 15, as shown in FIGS. 1 to 6 inclusive, or 16, as shown in FIG. 13. Each fishplate 15 has opposite ends forming laterally enlarged bottom and top edges 17 adapted to engage against one lateral face of the rail ends 1 and 2. The enlarged edges 17 define a lateral recess intermediate the ends and on one side of the fishplate 15, which recess is adapted to extend along the rail joint members 3 and 4 over more than the full combined length thereof to take into account the greater width of the same compared to the width of the web 10.

The fishplate 16 is of regular cross-section throughout its length and has its intermediate portion engaging the rail joint members. Shims 18 are provided to take into account the above-mentioned difference in thicknesses between the rail joint members 3 and 4 and the rail ends 1 and 2.

Each fishplate 15 and 16 is formed with three holes or bores 19 arranged to transversely align with the above-mentioned holes or bores of one rail end and the adjacent rail joint member. Each fishplate 15 and 16 is further provided with four laterally extended transverse apertures 20 arranged to align with the bores or holes of the other rail end and rail joint member. It will be readily understood that the numbers of bores 19 and apertures 20 are variable at will within practical limits and so as to match corresponding bores and/or apertures throughout the rail ends 1 and 2 and the rail joint members 3 and 4.

A bolt 21, of any conventional type, extends through the elongated apertures 13 and the innermost elongated apertures 20 of the fishplates 15 or 16 and is secured to allow relative lengthwise displacement between the rail joint members 3 and 4.

Bolts of different type secure the fishplates 15 or 16 to the rail ends 1 and 2 and to the end portion of the rail joint members 3 and 4 and are arranged to secure one rail joint member the adjacent rail end and one fishplate for bodily displacement thereof and the other rail joint member, the other rail end and the other fishplate also for bodily displacement thereof but for longitudinal displacement of one rail joint member relative to the other. The above-mentioned different bolt includes opposite end portions 22 and 23 of smaller and larger diameters respectively forming intermediate radial shoulder and threaded at both ends to be secured in place by a pair of nuts 24 and 25. The radial shoulder cooperating with the nut 24 to fixedly secure the fishplate on one side to one rail end and the abutting rail joint member while the nut 25 on the other side loosely secures the other fishplate to allow bodily sliding of the latter with the other rail joint member and the other rail end.

To install a joint according to the present invention into an existing railway, one rail section is cut and the cut portion is removed to form a longitudinal space of sufficient length to place the rail joint members 3 and 4 therein and to allow for expansion and contraction thereat. The socket for a projection 14 may be formed by cutting the rail section substantially tangentially to a transverse bore previously drilled through the rail section. The necessary bores are thereafter drilled on the railway site through the rail ends 1 and 2 which have been formed by cutting the one rail section. Manufactured rail joint members 3 and 4 and matching fishplates 15 or 16 are then bolted into place in the above-mentioned manner to allow longitudinal displacement of the lapping portions 7 alongside each other, thereby forming an expansion joint without having to disturb any rail section from its installed position.

It should be readily understood at least by persons skilled in the art that many changes in the details of construction of the illustrated embodiment are possible without departing from the principle of the invention and they fall within the scope of the appended claims.

What is claimed is:

1. A rail fish joint adapted to be connected between a first rail end and a second rail end spaced apart and arranged end to end relative to each other, said fish joint comprising a first and a second rail joint member, each having a first end portion adapted to abut against one of said rail ends and having a first head portion of normal rail width and the opposite end portion consisting of a lapping portion having a second head portion of reduced width, said lapping portion being constructed and arranged to laterally overlap the lapping portion of the other rail joint member, said lapping portions making contact along three surfaces which appear piecewise linear and continuous when seen in plan view, the second of said surfaces being parallel to the length of the rail and the other two said surfaces being oblique to said rail joint members and parallel to each other and joining in lateral transition said second surface to the outer edges of said rail joint members, said fish joint further comprising a pair of fishplates adapted to be positioned on opposite sides of said rail joint members, one of said fishplates being rigidly secured to said first rail end and also rigidly secured to the first rail joint member abutting the latter for preventing bodily displacement between the first rail end and the first rail joint member and also secured to said second rail end and to said second rail joint member for allowing sliding displacement with respect to the second rail end and the second rail joint member alongside thereof, and the other of said fishplates being rigidly secured to said second rail end and also rigidly secured to said second rail joint member for preventing bodily displacement between the second rail end and the second rail joint member and also secured to said first rail end and to said first rail joint member for allowing sliding displacement with respect to said first rail end and said first rail joint member alongside thereof.

2. A rail fish joint as defined in claim 1, wherein each of said lapping portions and said rail ends includes a web and the web of each lapping portion has a thickness substantially equal to the thickness of the web of said rail ends.

3. A rail fish joint as defined in claim 2, wherein each of said fishplates is formed with a transversely profiled and enlarged base and head edges extending at opposite ends and along one side thereof and arranged to engage the coresponding side of said rail ends at opposite ends of said rail joint members and to define an intermediate lateral recess for sliding displacement of the latter therein.

4. A rail fish joint as defined in claim 2, wherein said fishplates are of substantially uniform transverse cross-section and have their opposite ends spaced laterally outwardly from said rail ends and shims are engaged between said opposite ends and said rail ends and arranged to slidably guide said fishplates.

5. A rail fish joint as defined in claim 2, further including said rail ends, and nuts and bolts securing said fishplates to said rail ends and to said rail joint members, each of said fishplates includes holes and elongated apertures projecting transversely therethrough with the latter extending also laterally lengthwise of said rail ends, each of said bolts includes a larger end portion engaging into one of said elongated apertures and arranged to abut against one of said rail ends and rail joint members, one of said nuts is screwed onto one end of each of said bolts and arranged to tighten one of said fishplates with said one of said rail ends and rail joint members and another of said nuts is screwed onto the other end of each of said bolts and arranged to slidably retain the other of said fishplates alongside said one of said rail ends and rail joint members, shims are positioned between said rail ends and said fishplates, and flats are formed onto said bolts and constructed and arranged to hold the latter against rotation.

6. A rail fish joint as defined in claim 1, further including bolts securing said fishplates to said rail ends and to said rail joint members, each of said bolts including a radial abutment intermediate the ends thereof and adapted to engage one side of one of said rail ends and rail joint members and tightening elements provided at the opposite ends of said bolts respectively.

7. A rail fish joint as defined in claim 1, wherein each of said first end portions has a socket joint means arranged to interlock with the corresponding rail end for bodily displacement therewith lengthwise of the latter.

8. A rail fish joint as defined in claim 1, further including bolts securing said fishplates to said rail ends and to said rail joint members, said fishplates have elongated apertures therethrough and said bolts extend into said apertures and are arranged to allow said sliding displacement of said fishplates.

9. A method of making a rail fish joint comprising arranging a pair of rail ends in spaced-apart end-to-end relationship relative to each other, providing a first and a second rail joint member each including one end portion adapted to abut against one of said rail ends and having a head of normal rail width and a lapping portion having a head of reduced width, positioning said first and said second rail joint members into the space defined between said pair of rail ends with said one end portions into abutment with said rail ends and said lapping portions laterally overlapping each other and extending lengthwise of said rail ends for relative displacement alongside each other, securing one fishplate on one side of said rail joint members to one of said rail ends and to the first rail joint member abutting the latter for bodily displacement therewith and to the other of said rail ends and to said second rail joint members for sliding displacement alongside thereof, and securing another fishplate on the opposite side of said rail joint members to said other rail end and to the second rail joint member for bodily displacement therewith and to said one rail end and to said first rail joint member for sliding displacement alongside thereof and wherein the arrangement of a pair of rail ends in spaced-apart end-to-end relationship is done by cutting an installed rail to form said space and by boring said rail ends on the railway site to allow bolting of said fishplates and said joint members to said rail ends.

10. A method of making a rail fish joint as defined in claim 9, wherein each of said end portions has a free end formed with a socket engaging projection, said method further including forming a socket at the free end of each of said rail ends and arranging said socket to be engaged by said projections respectively and to lock the rail joint members to the rail ends respectively.

* * * * *